United States Patent [19]
Stohler et al.

[11] Patent Number: 5,831,357
[45] Date of Patent: Nov. 3, 1998

[54] SNAP-ON HEAT SHIELD FOR A STARTER SOLENOID

[75] Inventors: Michael D. Stohler, Anderson; James L. Whitehurst, Muncie, both of Ind.

[73] Assignee: Delco Remy America, Inc., Anderson, Ind.

[21] Appl. No.: 893,142

[22] Filed: Jul. 15, 1997

[51] Int. Cl.[6] .............................. H02K 5/00; F02B 77/00; F02B 77/11
[52] U.S. Cl. ................................ 310/52; 310/89; 310/64; 123/198 E
[58] Field of Search .................................. 310/52, 64, 89; 123/198 E; 335/278; 290/48

[56] References Cited

U.S. PATENT DOCUMENTS

| | | | |
|---|---|---|---|
| 5,233,953 | 8/1993 | Whitehurst et al. | 123/198 E |
| 5,649,510 | 7/1997 | Linze | 310/89 |

Primary Examiner—Clayton E. Laballe
Attorney, Agent, or Firm—Ice Miller Donadio & Ryan; Jay G. Taylor

[57] ABSTRACT

A heat shield for shielding the solenoid of an engine starter from heat generated by an internal combustion engine. The shield is formed of metal and has a front pair of deflectable spring arms and a rear pair of deflectable spring arms for securing the heat shield to a solenoid of an engine starter. The arms have arcuate portions that are adapted to engage the case of the solenoid and the arms are deflected apart when the shield is assembled to the solenoid. The arms then spring back toward each other to tightly grip the solenoid. The front pair of deflectable spring arms are equipped with ribs extending from the arcuate portions and bending around one end of the solenoid to prevent axial movement of the heat shield relative to the solenoid. The heat shield has a collar to engage another end of the solenoid and prevent axial movement of the heat shield relative to the solenoid. The heat shield has a spring finger that prevents the shield from moving beyond a proper assembled position.

12 Claims, 2 Drawing Sheets

SNAP-ON HEAT SHIELD FOR A STARTER SOLENOID

FIELD OF THE INVENTION

This invention relates to engine starters, and more particularly to a heat shield for the solenoid of an electric engine starter for shielding the solenoid from heat generated by an internal combustion engine.

BACKGROUND OF THE INVENTION

When an engine starter is mounted on an internal combustion engine in such a position that the starter solenoid is located near the exhaust manifold of the engine, the solenoid is exposed to extreme temperatures. If the solenoid is not heat shielded, the solenoid may be heat damaged and the solenoid performance is reduced due to an increase in solenoid coil electrical resistance caused by the elevated temperature. Heat shields heretofore used in the art have required fasteners to attach them to the solenoid thereby increasing assembly and product costs or have not had means to prevent lateral movement of this shield in both directions once attached to the solenoid. Thus, it is an object of this invention to provide a heat shield arrangement for a starter solenoid that does not use threaded fasteners for securing the heat shield to the starter. SUMMARY OF THE INVENTION A heat shield made in accordance with this invention is configured to be snapped onto the starter solenoid. More specifically, the heat shield of this invention is formed of spring steel material that has a front pair and a rear pair of spring arms or legs that can be sprung apart to assemble the heat shield onto the starter solenoid. These arms, when in the assembled position, tightly engage opposed surfaces of the solenoid to keep heat shield in a fixed position away from the solenoid. The front pair of spring arms each have a rib extending from the arm to engage an end of the solenoid, and a collar is also formed on the other end of the heat shield to engage the other end of the solenoid and prevent lateral movement of the heat shield relative to the solenoid. The heat shield further has a spring finger or leg, which serves as a stop to prevent the heat shield from going beyond its assembled position.

DETAILED DESCRIPTION

Figure 1:
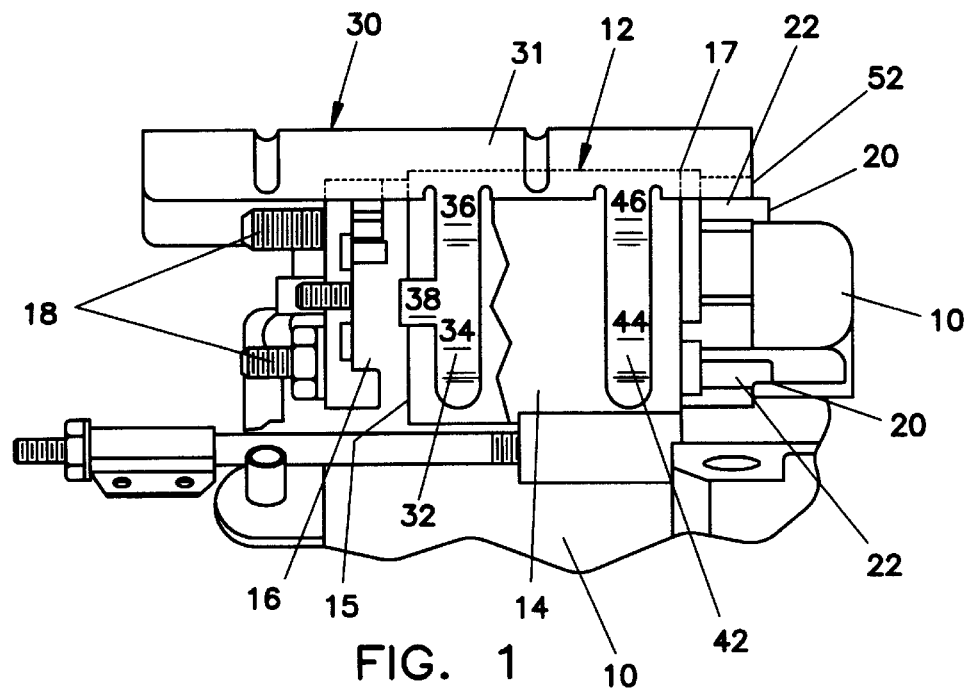
FIG. 1 is a side view of a portion of an electric engine starter showing a heat shield made in accordance with this invention secured to a starter solenoid.
Figure 2:
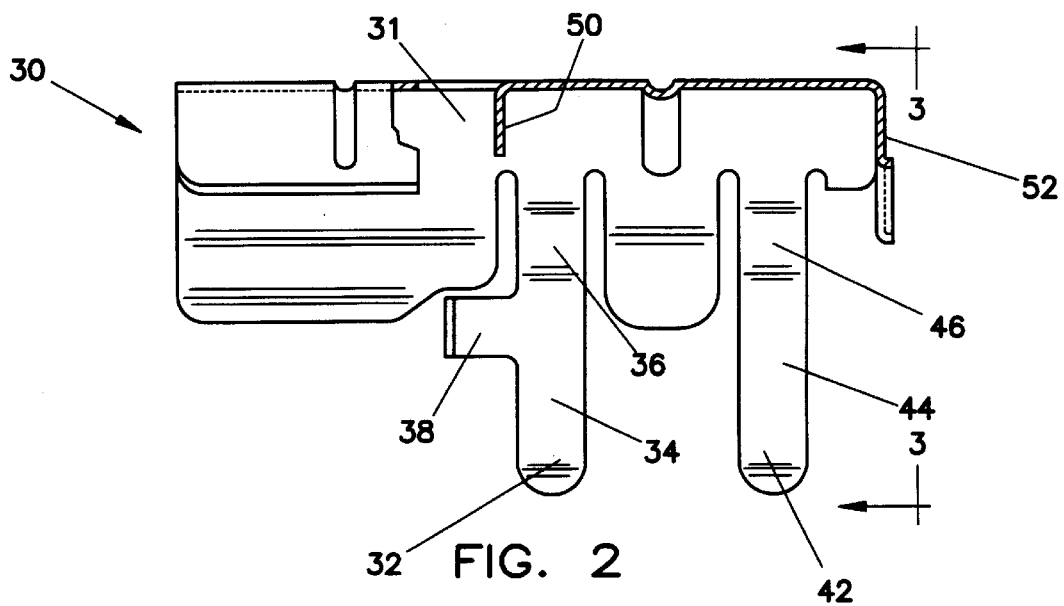
FIG. 2 is a partial crossectional side view of the heat shield.
Figure 3:
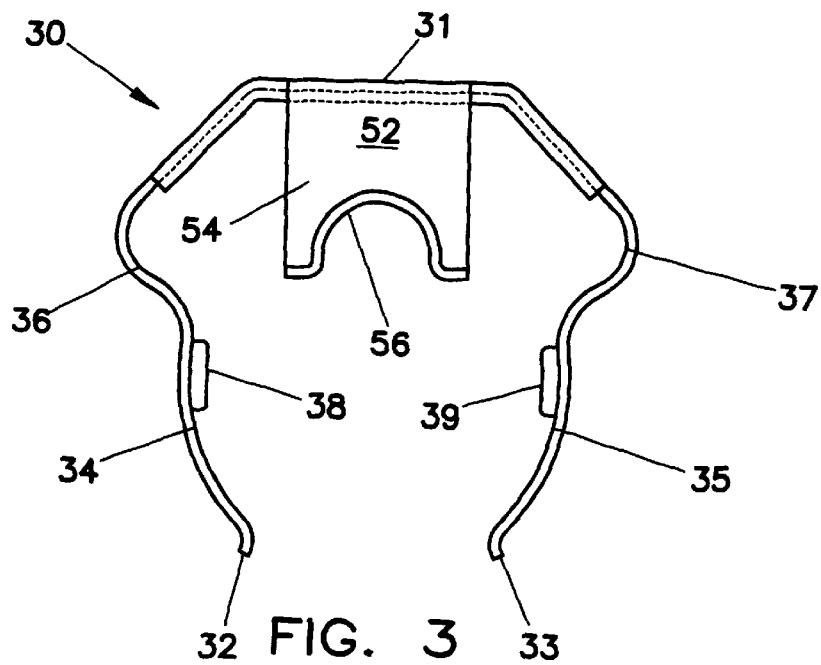
FIG. 3 is an end view of the heat shield looking in the direction of the arrows 3—3 of FIG. 2.
Figure 4:
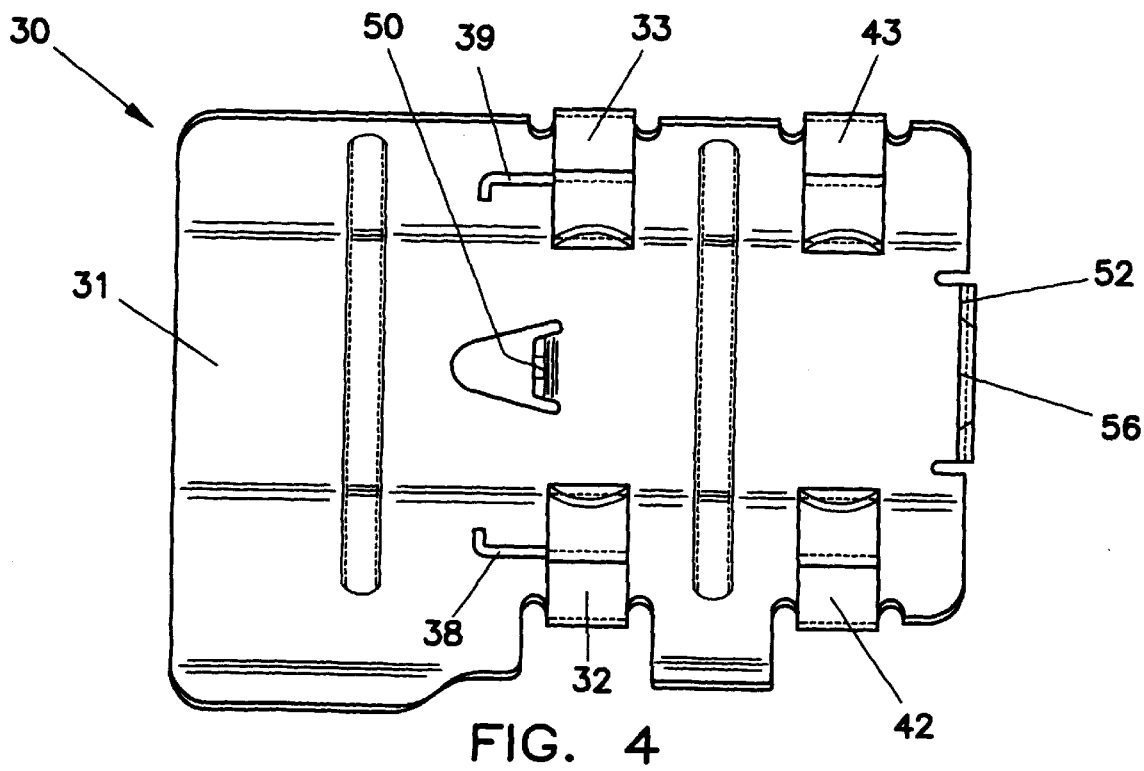
FIG. 4 is a bottom view of the heat shield.

Referring to FIG. 1, a portion of an electric engine starter motor 1 is illustrated. This engine starter motor 1 has a drive housing 10 which contains a shift lever (not illustrated) that operates with a solenoid 12 to move a pinion (not illustrated) into and out of mesh with the ring gear of an engine.

The solenoid 12 of the engine starter has an outer metallic case 14 that has a cylindrical configuration. The solenoid further has a terminal end 15 and a mounting end 17. An end cap 16 is formed of electrical insulating material and supports terminals 18 on the terminal end 15 of the solenoid 12.

The case 14 encloses a conventional solenoid pull-in coil winding and a hold-in coil winding (not illustrated). These windings cooperate in a manner known well in the art with a solenoid plunger or armature (not illustrated) that has one end connected to the starter shift lever in a conventional manner. Threaded fasteners 20 are provided for securing the solenoid 12 to drive housing 10. The fasteners 20 have threaded portions that are threaded into bosses 22 integral to the housing.

Referring now to FIGS. 1–4, a heat shield 30 in accordance with this invention is illustrated. The heat shield 30 is formed of a heat treated spring steel or comparable material that may be about 1.0 mm. thick. The steel is plated with a zinc dichromate or epoxy coating that offers excellent salt spray resistance, high service temperature stability, and is gold in color. Additionally, the zinc dichromate or the epoxy is flexible yet scuff resistant. Such an epoxy is produced by Modern Materials, Inc. of Rochester, Ind.

The heat shield 30 has a main axially extending heat shield portion 31. Portion 31 is generally smooth and is curved at two locations 31a and 31b to allow portion 31 to partially wrap-around the solenoid for added heat protection. The portion 31 also includes a first pair of resilient spring arms 32 and 33 that are integral with portion 31 and in symmetric opposition to one another. Arm 32 has a semicircular or arcuate portion 34 dimensioned to have an arc comparable to the cylindrical outer surface of metallic case 14 of solenoid 12. Arm 32 also comprises a shoulder portion 36 bent into a wave, and a protruding L-shaped rib 38. Likewise, arm 33 is the reverse image of arm 32 and has a comparable semicircular or arcuate portion 35, a shoulder portion 37, and a protruding L-shaped rib 39.

The axially extending heat shield portion 31 also includes a second pair of resilient spring arms 42 and 43 that are integral with portion 31 and in symmetric opposition to one another. Like arm 32 and 33, arm 42 has a semicircular or arcuate portion 44 dimensioned to have an arc comparable to the cylindrical outer surface of metallic case 14 of solenoid 12. Arm 32 also comprises a shoulder portion 46 forming a wave. Likewise, arm 43 is the reverse image of arm 42 and has a semicircular or arcuate portion 45 and a shoulder portion 47 forming a wave.

The heat shield 30 also includes a spring finger 50 integrally formed to the axially extending heat shield portion 31. The spring finger 50 is a "V" shaped member projecting in a perpendicular fashion from near the center of portion 31.

The heat shield 30 also has a collar 52 integrally formed to the axially extending heat shield portion 31 and oriented perpendicular to the portion 31 at one end of the heat shield 30. Collar 52 is comprised of a flat plate 54 having a semi-circular aperture 56 therein.

FIG. 1 shows the heat shield 30 assembled to the engine starter and the manner in which this is accomplished will now be described.

To assemble heat shield 30 to the starter, the ribs 38 and 39 are aligned with the terminal end 15 of the solenoid 12, and the collar 52 is aligned with one of the bosses 22. Spring arms 32 and 33 are positioned near the terminal end 15 of the solenoid and spring arms 42 and 43 are positioned near the mounting end 17 of the solenoid. As spring arms 32, 33, 42, and 43 are pushed onto the solenoid case 14, they are forced apart by the solenoid case. Spring finger 50 distances heat shield portion from 31 from solenoid 12 and prevents heat shield 30 from being pushed beyond its proper assembled position. The arms of the heat shield spring back toward their non-assembled position and into a final assembled position where the inner surfaces of arcuate portions 34, 35, 44, and 45 engage the outer arcuate surface portions of case 20. Because the arms 32, 33, 42, and 43 spring back toward their original position, the arms tightly grasp the solenoid 12 when arcuate portions 34, 35, 44, and 45 engage opposing sides of the solenoid. In the final assembled position of heat shield 30, the distance between arms 32, 33, 42, and 43 is greater than the distance between these arms prior to assembly. Thus, the diameter of case 14 is such that the arms 32, 33, 42, and 43 are deflected away from each other when they are assembled to case 14 so that there is constant spring tension holding heat shield 30 to solenoid 12. The spring arms thereby maintain the arms in tight embrace with the case of the solenoid.

When the heat shield is assembled, L-shaped ribs 38 and 39 reach around the solenoid case 14 where the front spring arms 32 and 33 are located to partially cover the terminal end 15 of the solenoid. Furthermore, collar 52 extends toward one of the bosses 22 such that semi-circular aperture 56 encompasses boss 22.

Arms 32, 33, 42, and 43 form the primary support for the heat shield. The arms 32, 33, 42, and 43 and collar 52 tend to prevent turning or rotation of the shield 30 relative to the solenoid 12. The arms 32, 33, 42, and 43, ribs 38 and 39, and collar 52 also prevent axial lateral movement of the heat shield relative to the solenoid. By introducing a stop means at each end of the solenoid, the ribs 38 and 39 and collar 52 especially limit axial movement of the heat shield relative to the solenoid in both directions.

In the final assembled position of the heat shield 30, as shown in FIG. 1, the heat shield portion 31 extends for the entire length of solenoid 12 and terminals 18. More specifically, the heat shield portion 31 extends axially from bosses 22 of housing 10 to a point beyond the solenoid terminals 18. The starter is mounted on an engine in such a position that the heat shield portion 31 of heat shield 30 is located between the exhaust manifold of the engine and the solenoid. It, therefore, shields the solenoid from heat generated by the engine.

Thus, as may be recognized by one skilled in the art, various modifications, alterations, and changes may be made to the embodiment described above without departing from the spirit and scope of the invention as defined in the appended claims.

What is claimed is:

1. A heat shield for an engine starter motor, the starter motor including a solenoid having an outer cylindrical surface, a terminal end and a mounting end; said heat shield comprising:
   (a) a heat shield portion spaced apart from the outer cylindrical surface and extending axially of the outer cylindrical surface to provide a heat shield for the solenoid;
   (b) a pair of opposed first spring arms symmetrically opposed and integrally formed to said heat shield portion, each spring arm having an arcuate portion for engaging the outer cylindrical surface of the solenoid, and a retaining rib for engaging the terminal end of the solenoid to prevent axial movement of the metallic heat shield; and
   (c) a collar integral with said heat shield portion and perpendicularly extending from said heat shield portion, said collar engaging the mounting end of the solenoid to prevent axial movement of the metallic heat shield.

2. The heat shield of claim 1 wherein the metallic heat shield further comprises a pair of opposed second spring arms symmetrically opposed and integrally formed to said heat shield portion, each second spring arm having an arcuate portion for engaging the outer cylindrical surface of the solenoid.

3. The heat shield of claim 1 wherein the metallic heat shield further comprises a spring finger integrally formed to said heat shield portion and extending therefrom to prevent the heat shield from moving beyond a proper assembled position.

4. The heat shield of claim 1 wherein said heat shield portion has an arcuate shape.

5. The heat shield of claim 1 wherein the metallic heat shield is composed of a spring steel material.

6. The heat shield of claim 1 wherein the metallic heat shield is coated with an epoxy or plated with zinc dichromate.

7. A heat shield for shielding a solenoid of an engine starter, the solenoid having two ends and the heat shield comprising:
   (a) a shield portion extending axially for the length of the solenoid and having at least one curve causing said shield portion to partially wrap-around the solenoid;
   (b) a pair of spring arms, each spring arm integral with said shield portion and including a semicircular portion and a retention rib, said semicircular portion of the spring arms engaging the solenoid and said retention ribs extending from said arms and engaging one end of the solenoid to prevent axial movement; and
   (c) a collar integral with said shield portion and positioned to engage with an opposite end of the solenoid to prevent axial movement.

8. The heat shield of claim 7 wherein the heat shield further comprises a second pair of spring arms, each spring arm integral with said shield portion and including a semicircular portion for engaging the solenoid.

9. The heat shield of claim 7 wherein the heat shield further comprises a spring finger integral to said shield portion and extending from said shield portion to position said heat shield apart from the solenoid during assembly.

10. The heat shield of claim 7 wherein the heat shield is composed of a spring steel material.

11. The heat shield of claim 7 wherein the heat shield is coated with an epoxy or plated with zinc dichromate.

12. A metallic heat shield for protecting a solenoid having an outer cylindrical case, a terminal end and a mounting end from heat, the heat shield comprising:
   (a) a heat shield portion spaced apart from the outer cylindrical surface and extending axially of the outer cylindrical surface to provide a heat shield for the solenoid;
   (b) a first and a second front spring arm symmetrically opposed and integral with said heat shield portion, each front spring arm having an arcuate portion for engaging the outer cylindrical surface of the solenoid near the terminal end, and an L-shaped rib extending from the spring arm to engage the terminal end of the solenoid and prevent axial movement of the metallic heat shield;
   (c) a first and a second rear spring arm symmetrically opposed and integral with said heat shield portion, each rear spring arm having an arcuate portion for engaging the outer cylindrical surface of the solenoid near the mounting end;
   (d) a collar integral with said heat shield portion and perpendicularly extending from said heat shield portion, said collar engaging the mounting end of the solenoid to prevent axial movement of the metallic heat shield; and
   (e) a spring finger integral to said heat shield portion and engaging a portion of the outer cylindrical surface of the solenoid to position the heat shield apart from the solenoid during assembly.

* * * * *